(12) United States Patent
Britton

(10) Patent No.: US 6,986,863 B2
(45) Date of Patent: *Jan. 17, 2006

(54) CONTAINERS

(76) Inventor: Charles Jonathan Britton, 19, High Street, Avening, Tetbury, Gloucestershire (GB), GL8 8NF ( * ) Notice: Subject to any disclaimer, the term of this patent is extended or adjusted under 35 U.S.C. 154(b) by 276 days.

This patent is subject to a terminal disclaimer.

(21) Appl. No.: 10/126,533

(22) Filed: Apr. 22, 2002

(65) Prior Publication Data

US 2002/0108958 A1 Aug. 15, 2002

Related U.S. Application Data

(63) Continuation of application No. 09/077,528, filed as application No. PCT/GB96/02938 on Nov. 29, 1996, now Pat. No. 6,413,468.

(30) Foreign Application Priority Data

Nov. 30, 1995 (GB) ............................................. 9524553

(51) Int. Cl.
   *B29C 49/06* (2006.01)
   *B29C 49/08* (2006.01)
   *B65D 1/42* (2006.01)

(52) U.S. Cl. ...................... 264/532; 264/537; 220/657; 425/525; 425/533; 425/529

(58) Field of Classification Search ................ 264/532, 264/537; 425/525, 529, 533; 220/657
   See application file for complete search history.

(56) References Cited

U.S. PATENT DOCUMENTS

| | | |
|---|---|---|
| 3,482,724 A | 12/1969 | Heaton |
| 4,367,821 A | 1/1983 | Holt |
| 4,941,815 A | 7/1990 | Julian |
| 5,117,993 A | 6/1992 | Vesborg |
| 5,126,177 A | 6/1992 | Stenger |
| 5,297,686 A | 3/1994 | Takeuchi |
| 5,352,402 A | 10/1994 | Orimoto et al. |
| 5,501,590 A | 3/1996 | Orimoto et al. |
| 6,413,468 B1 * | 7/2002 | Britton ........................ 264/537 |

FOREIGN PATENT DOCUMENTS

| | | |
|---|---|---|
| EP | 0480836 A2 | 4/1992 |
| EP | 0 480 836 A2 A | 4/1992 |
| GB | 2 278 802 A | 12/1994 |
| JP | 61-61823 | 3/1986 |
| JP | 61-61823 A | 6/1994 |

* cited by examiner

Primary Examiner—Suzanne E. McDowell
(74) Attorney, Agent, or Firm—Flynn, Thiel, Boutell & Tanis, P.C.

(57) ABSTRACT

A container is made in two stages from thermoplastics material. In the first stage a preform (1) is injection moulded, the mould parts easily releasing a tubular body (2) with a closed end and an outwardly projecting rim (3) at the open end. In the second stage the still heated preform (1) is blow moulded, possibly with some preliminary mechanical stretching, with the blow pin (13) seated in the open end of the body (2) and the preform (1) held by the other part (7) of its rim. The wall of the body (2) is expanded, and immediately below the open end it is stretched outwardly to meld with the underside of the inner part (5) of the rim. The resultant container thus has a mouth defined by an inset lip. It may be of paint tin form, with a drip groove (9) around the mouth.

32 Claims, 1 Drawing Sheet

CONTAINERS

CROSS-REFERENCE TO RELATED APPLICATION

This is a continuation of application Ser. No. 09/077,528, filed Nov. 29, 1996, now U.S. Pat. No. 6,413,468.

FIELD OF THE INVENTION

This invention relates to containers, and is particularly concerned with a method of manufacture of containers that resemble tins with press-in lids which can be levered off using the rim of the container as a fulcrum.

BACKGROUND OF THE INVENTION

Containers of the above type have traditionally been produced in metal, and have been widely used for such contents as paint, drinking chocolate and cornflour.

Versions in plastics material have been manufactured, and hitherto they have been produced by welding together two discrete mouldings. The reason for this two-piece construction is the inward overhang of the top flange or rim. If known injection moulding methods are employed, it has been considered impossible to arrange it so that the inside male core can be extracted. The opening is too small to permit any form of collapsible insert. Blow moulding might offer a solution, but the problem with the rim has not been solved.

It is the aim of this invention to overcome this difficulty and to enable such a container to be made by blow moulding.

SUMMARY OF THE INVENTION

According to one aspect of the present invention there is provided a method of making a container to which entry is via an opening inset from adjacent container walling, the material of the container being susceptible to deformation when heated, wherein in a first stage an embryo container is formed with a rim defining an opening projecting outwardly from what is to become the container walling, and wherein in a second stage that embryo container walling, at an elevated temperature, is urged outwardly while the rim is held, whereby the walling expands to leave the inner part of the rim inset therefrom.

It will be assumed hereafter that both the embryo and finished container are in an upright attitude with the opening uppermost.

The formation of the embryo container in the first stage is conveniently by injection moulding using an inner mould core which is subsequently extractable through said opening, while the transformation from embryo to finished container in the second stage is preferably by blow moulding via the opening, although at least some of the distortion or stretching inherent in the process could be achieved mechanically.

In the preferred form, the opening of the embryo container widens towards the mouth, locally thinning the container walling. The rim may then include a lateral flange projecting outwardly from the portion of thinned walling, this thinned portion being deformed in the second stage to co-operate with the underside of the flange. The embryo container also preferably has a further flange on the lateral flange, projecting downwardly to surround the opening end of the container, and the deformation of the thinned portion extends to it being forced against the inside of the further flange and to step out below its free edge.

With this arrangement, and if the material of the container is transparent, a data band can be provided on the inside of the further flange of the embryo container to be legible therethrough, the band being made captive by the deformed thinned portion.

Conveniently, at the root of the lateral flange there is an upstanding rib which internally smoothly continues the contour of the mouth of the opening. Also, at the outer edge of the lateral flange there may be, on the upper side, a stepped extension forming with said rib an upwardly open channel around the opening. The stepped extension may project laterally beyond the flange, its underside providing means for locating the embryo container during the blow moulding.

According to another aspect of the present invention there is provided a container having improved construction, a container made by the method outlined above, and an apparatus for making a container.

BRIEF DESCRIPTION OF THE DRAWINGS

For a better understanding of the invention, one embodiment will now be described, by way of example, with reference to the accompanying drawing, in which.

DETAILED DESCRIPTION

Figure 1:
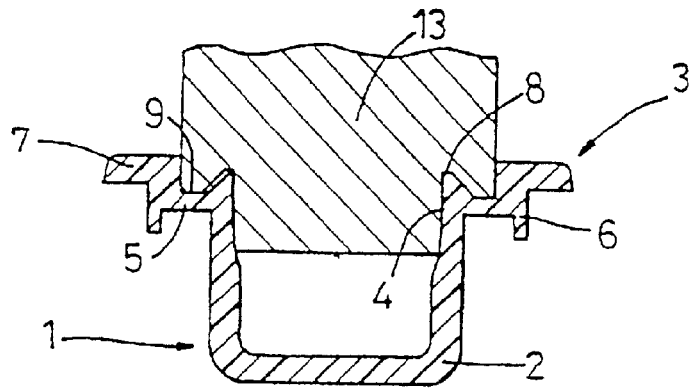
FIG. 1 is an axial section of a preform of a container prior to blow moulding.

A preform or embryo container 1 has a flat bottomed, bowl shaped body 2 with an outwardly projecting ring or rim portion 3 at the mouth of the body 2. It is of plastics material formed by injection moulding, and its shape is such that the mould can be of just two parts which, when the plastics has set, can be separated by movement in the axial direction to release the preform 1. There are no undercuts to complicate the mould.

Towards the top of the body 2, its cylindrical wall becomes thinner, tapering in a smooth concave curve 4 on the inside to about half the thickness of the rest of the body 2. Projecting radially outwards from this the ring 3 has a flange 5, and at the outer periphery of this flange there is a further flange 6 projecting downwardly as a co-axial cylindrical skirt. The ring 3 also has a stepped extension 7 projecting above the flange 5 and radially beyond the flange 6. At the root of the flange 5, there is an upstanding annular rib 8 which internally smoothly merges into the curved surface 4. Externally, it slopes down into a channel 9 whose outer side is defined by the extension 7.

For blow moulding, the preform 1 is transferred from an injection mold to a blow mould while still hot. The blow mould comprises two halves 10 and 11 with a base insert or punt 12. The preform 1 rests by its extension 7 on the edge of the mould cavity and the flange 6 fits snugly in the mouth of that cavity. These parts are cooled quicker than the rest and so solidify enough to provide firm support and location. A blow pin 13 is shaped to snugly fit the groove 9, the rib 8 and the upper part of the curved surface 4 which defines the opening into the preform. This contact of the blow pin 13 with the plastics material of the rim portion 3 contributes to the local cooling and solidification thereof.

Figure 2:
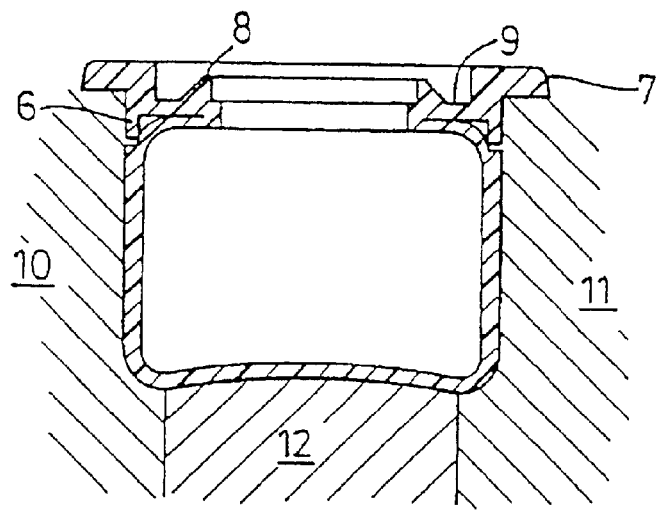
FIG. 2 is an axial section of a container in a mould having been expanded by blow moulding from the preform of FIG. 1.
Figure 3:
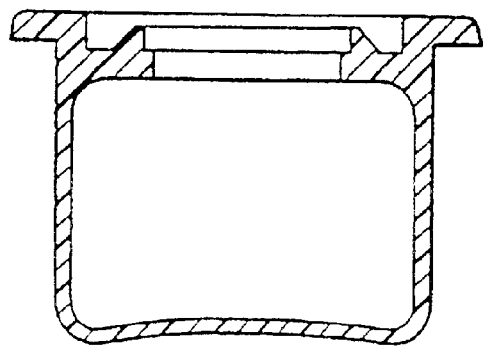
FIG. 3 is an axial section of the finished released container.

Air under pressure is then introduced into the preform 1 through the blow pin 13. With the rest of the plastics material of the preform still soft and pliable, the pressurized air in the preform 1 causes the thinned portion of its wall near the top to be stretched and expanded radially, so that it is forced against the underside of the flange 5 and the inside of the flange 6. It then flows around the underside of that flange 6 to meet the wall of the blow mould cavity. The pressurized air inside the body 2 causes the rest of the body 2 to expand and eventually, with blowing complete, the container is as shown in FIG. 2. The heat is such that where two plastics surfaces have been urged together they become effectively homogeneous. The finished container is therefore as shown in FIG. 3. As soon as the material is cooled and set, the blow mould halves 10 and 11 are opened and the blow pin 13 is retracted to free the complete moulding.

It will be seen that the finished container resembles a conventional paint tin with the channel 9 for drips, and the extension 7 providing a fulcrum for levering off a lid pressed into the opening whose mouth is defined by the rib 8.

The most common shape of the finished container will be cylindrical. However, it would be possible to apply this technique to other shapes, for example elliptical in cross-section or even polygonal.

Various plastics materials are suitable, including polyvinyl chloride, high density polythene, polypropylene, acrylic or polycarbonate. Since the one-piece construction offers savings, more expensive materials such as polyethylene terepthalate (P.E.T.), polyethylene napthalate (P.E.N.) and copolymers and blends of these two materials in both crystalline and amorphous forms could be viable.

While blow moulding is expected to be the preferred method of expansion, aided by mechanical stretching for large containers, it may be possible to achieve the same effect by suction moulding.

In a first embodiment of the disclosed invention, there is a method of making a container to which entry is via an opening inset from adjacent container walling, the material of the container being susceptible to deformation when heated, wherein in a first stage an embryo container 1 is formed with a ring 3 defining the opening substantially in its final form and with the remaining portion, which is to become the container walling, of reduced size compared with its final form, and wherein in a second stage that embryo container walling 2, at an elevated temperature, is urged outwardly by blow moulding while the ring 3 is held, whereby the walling 2 expands laterally in relation to the opening, wherein the ring 3 provides a seat for a press-in lid and projects outwardly from the embryo container walling, and wherein a blow pin enters closely into the opening to blow the embryo container walling to its final shape.

In a second embodiment of the disclosed invention, there is a method of making a container as in the first embodiment described above, wherein the formation of the embryo container 1 in the first stage is by moulding in a two part mould one part of which has a core subsequently extractable through said opening.

In a third embodiment of the disclosed invention, there is a method of making a container as described in the second embodiment described above, wherein the formation of the embryo container 1 is by injection moulding.

In a fourth embodiment of the disclosed invention, there is a method of making a container as described in any of the embodiments described above, the opening of the embryo container widens towards the mouth, locally thinning the container walling 4, this thinned portion being deformed in the second stage to co-operate with the underside of said ring.

In a fifth embodiment of the disclosed invention, there is a method of making a container as described in any of the embodiments described above, wherein the ring 3 has a flange 6 projecting down to surround the opening end of the container.

In a sixth embodiment of the disclosed invention, there is a method of making a container as described in the fifth embodiment described above, wherein the deformation of an upper end section 4 of the embryo container causes it to be forced against the inside of said flange 6 and to step out below its free edge.

In a seventh embodiment of the disclosed invention, there is a method of making a container as described in the sixth embodiment described above, wherein the material of the container is transparent and a data band is provided on the inside of said flange 6 of the embryo container 1 to be legible therethrough, the band being made captive by the deformed portion 4.

In an eighth embodiment of the disclosed invention, there is a method of making a container as described in any of the embodiments described above, wherein the upper side of the ring 3 has a peripheral channel 9 defined on the inside by an upstanding rib 8 and on the outside by an outer zone 7 which is upwardly stepped.

In a ninth embodiment of the disclosed invention, there is a method of making a container as described in the eighth embodiment described above, wherein the blow pin is shaped to mate with the rib 8 and the peripheral channel 9.

In an tenth embodiment of the disclosed invention, there is a container made by the method of any of the embodiments described herein.

In an eleventh embodiment there is an apparatus for making a container having the features described herein.

In a further embodiment of the invention, there is a method of making a container in which entry is via an opening inset from adjacent container walling of said container, said opening being in a rim of said container, said method comprising the steps of: injection molding an embryo container in a heated condition from a material susceptible to deformation when heated, said embryo container comprising a bowl-like container-walling-forming portion integrally and monolithically joined at one end thereof to an outwardly protruding annular rim portion, said rim portion defining an opening therethrough which opens into the interior of said container-walling-forming portion, said embryo container being molded in an injection mold including an inner mold core which is extractable through said opening, and said injection mold defining exterior surfaces of said annular rim portion of said embryo container in substantially the final form thereof; removing the embryo container in its entirety from the injection mold and transferring the embryo container at an elevated temperature to a further mold, preferably a blow mold, which has mold cavity walls defining the required final external shape of said container walling to be formed by said container-walling-forming portion; positioning said embryo container on said further mold so that the annular rim portion is supportingly engaged by an upper portion of the further mold and the container-walling-forming portion of the embryo container is suspended downwardly from the annular rim portion into a mold cavity defined by said walls; inserting a mold pin into said opening, and snugly engaging said annular rim portion between said further mold and said mold pin, thereby cooling said rim portion of said embryo container, with said container-walling-forming portion of said embryo container being spaced from said mold cavity walls of said further mold; stretching and expanding said container-walling-forming portion of said embryo container into contact with said mold cavity walls of said further mold by pressure differential between the interior and exterior of said container-walling-forming portion, while maintaining said annular rim portion snugly engaged by and between said further mold and said mold pin; and allowing said container to set and removing said container from said further mold.

What is claimed is:

1. A method of making a container to which entry is via an opening inset from adjacent container walling of said container, said opening being in a rim of said container, said method comprising the steps of:

injection molding an embryo container in a heated condition from a material susceptible to deformation when heated, said embryo container comprising a rim portion and a container-walling-forming portion, said rim portion having an upwardly-open channel formed intermediate an upstanding inner rib and a upwardly-stepped extension, said embryo container being molded in an injection mold including an inner mold core, said inner mold core being extractable through said opening, and said mold defining exterior surfaces of said rim portion of said embryo container in substantially the final form thereof;

transferring said embryo container at an elevated temperature to a blow mold, said blow mold defining the required final external shape of said container walling to be formed by said container-walling-forming portion;

inserting a blow pin into said opening, said blow pin being shaped to snugly fit said upwardly-open channel in said rim portion, said rim portion being snugly engaged by said blow mold and said blow pin, thereby cooling said rim portion of said embryo container, with said container-walling-forming portion of said embryo container being spaced from walls of said blow mold;

stretching and expanding said container-walling-forming portion of said embryo container with blow molding into contact with said walls of said blow mold; and allowing said container to cool to set and removing said container from said blow mold.

2. A method as claimed in claim 1, wherein said stretching and expanding step includes mechanical stretching.

3. A method as claimed in claim 1, wherein said material is selected from the group consisting of polyethylene terephthalate (P.E.T.), polyethylene naphthalate (P.E.N.), and copolymers and blends thereof in both crystalline and amorphous form.

4. A method as claimed in claim 1, wherein said transferring step comprises transferring said embryo container while still hot from said injection molding step.

5. A method as claimed in claim 1, wherein in said blow mold said embryo container is supported by said rim portion.

6. A method as claimed in claim 1, wherein said blow mold defines a mold cavity having a mouth and in said blow mold said rim portion fits snugly in said mouth of said mold cavity.

7. A method as claimed in claim 1, further comprising the step of providing a press-in lid which is a press fit in said opening of said container, whereby said opening forms a seat for said press-in lid and said lid can be levered off using said extension as a fulcrum.

8. A container made by the method of claim 1.

9. A method of making a container to which entry is via an opening inset from adjacent container walling of said container, said opening being in a rim of said container, said method comprising the steps of:

injection molding an embryo container in a heated condition from a material susceptible to deformation when heated, said embryo container comprising a rim portion and a container-walling-forming portion, said embryo container being molded in an injection mold including an inner mold core, said inner mold core being extractable through said opening, and said mold defining exterior surfaces of said rim portion of said embryo container in substantially the final form thereof;

transferring said embryo container at an elevated temperature to a blow mold, said blow mold defining the required final external shape of said container walling to be formed by said container-walling-forming portion;

inserting a blow pin into said opening, said rim portion being snugly engaged by said blow mold and said blow pin, thereby cooling said rim portion of said embryo container, with said container-walling-forming portion of said embryo container being spaced from walls of said blow mold;

stretching and expanding said container-walling-forming portion of said embryo container with blow molding into contact with said walls of said blow mold;

allowing said container to cool to set and removing said container from said blow mold; and providing a press-in lid which is a press fit in said opening of said container, whereby said opening forms a seat for said press-in lid and said lid can be levered off using said rim portion as a fulcrum.

10. A method of making a container to which entry is via an opening inset from adjacent container walling of said container, said opening being in a rim of said container, said method comprising the steps of:

injection molding an embryo container in a heated condition from a material susceptible to deformation when heated, said embryo container comprising a rim portion and a container-walling-forming portion, and said mold defining exterior surfaces of said rim portion of said embryo container in substantially the final form thereof with said rim portion having an upwardly-open channel formed intermediate an upstanding inner rib and an upwardly-extending extension;

transferring said embryo container at an elevated temperature to a blow mold, said blow mold defining the required final external shape of said container walling to be formed by said container-walling-forming portion;

inserting a blow pin into said opening, said rim portion being snugly engaged by said blow mold and said blow pin, with said blow pin being shaped to snugly fit said upwardly-open channel in said rim portion, and with said container-walling-forming portion of said embryo container being spaced from walls of said blow mold;

stretching and expanding said container-walling-forming portion of said embryo container with blow molding into contact with said walls of said blow mold;

removing said container from said blow mold; and providing said container when cooled with a press-in lid adapted to be pressed into said opening, wherein said upwardly-extending extension of said rim portion can be utilized to provide a fulcrum for levering off said lid.

11. A method as claimed in claim 10, wherein said stretching and expanding step includes mechanical stretching.

12. A method as claimed in claim 10, wherein said material is selected from the group consisting of polyethylene terephthalate (P.E.T.), polyethylene naphthalate (P.E.N.), and copolymers and blends thereof in both crystalline and amorphous form.

13. A method as claimed in claim 10, wherein said transferring step comprises transferring said embryo container while still hot from said injection molding step.

14. A method as claimed in claim 10, wherein in said blow mold said embryo container is supported by said rim portion.

15. A method as claimed in claim 10, wherein said blow mold defines a mold cavity having a mouth and in said blow mold said rim portion fits snugly in said mouth of said mold cavity.

16. A container made by the method of claim 10.

17. A container-making apparatus for making a container to which entry is via an opening inset from adjacent container walling of the container, the opening being in a rim of the container, the apparatus comprising:
   an injection molding apparatus adapted to mold an embryo container comprising a rim portion having an opening therethrough and a container-walling-forming portion, the injection molding apparatus comprising a plurality of molding parts adapted to mold an exterior surface of the rim portion of the embryo container so that the rim portion has an upwardly-open channel formed between an upstanding inner rib and an upstanding outer wall; and
   a blow molding apparatus comprising:
   a plurality of parts which define a blow mold cavity, the cavity having a mouth; and
   a blow pin adapted to be inserted through the mouth of the blow mold cavity and retracted therefrom, the blow pin being adapted to expand the container-walling-forming portion of the embryo container so that the container walling substantially conforms to the blow mold cavity;
   wherein the blow molding apparatus is adapted to receive the embryo container in such a manner that the rim portion is engaged by the blow molding apparatus and the container-walling-forming portion does not initially contact the blow mold cavity defining parts; and
   wherein the blow pin is configured to mate with the upwardly-open channel in the rim portion.

18. Apparatus as claimed in claim 17, wherein said blow molding apparatus is adapted to provide mechanical stretching.

19. Apparatus as claimed in claim 17, wherein said blow molding apparatus supports said embryo container by said rim portion.

20. A container that resembles a tin and is formed of a material selected from the group consisting of polyethylene terephthalate (P.E.T.), polyethylene napthalate (P.E.N.), and copolymers and blends thereof in both crystalline and amorphous form, said container comprising:
   a rim having an upwardly-open channel formed intermediate an upstanding inner rib and an upstanding outer wall, said upstanding outer wall having a downwardly-extending outer flange having a lower edge, and said rim defining an opening for said container;
   a container body forming a one-piece construction with said rim and including container walling forming a side wall thereof, said opening of said container being inset from said container walling, and said container walling depending from said opening, expanding outwardly against said lower edge of said flange and being homogeneous with said lower edge of said flange, and then stepping out below said lower edge of said flange to form said container outer wall; and
   a lid which is a press fit in said opening of said container, whereby said lid can be levered off using said upstanding outer wall as a fulcrum.

21. A method of making a container in which entry is via an opening inset from adjacent container walling of said container, said opening being in a rim of said container, said method comprising the steps of:
   injection molding an embryo container in a heated condition from a material susceptible to deformation when heated, said embryo container comprising a bowl-like container-walling-forming portion integrally and monolithically joined at one end thereof to an outwardly protruding annular rim portion, said rim portion defining an opening therethrough which opens into the interior of said container-walling-forming portion, said embryo container being molded in an injection mold including an inner mold core which is extractable through said opening, and said injection mold defining exterior surfaces of said annular rim portion of said embryo container in substantially the final form thereof;
   removing the embryo container in its entirety from the injection mold and transferring the embryo container at an elevated temperature to a blow mold which has mold cavity walls defining the required final external shape of said container walling to be formed by said container-walling-forming portion;
   positioning said embryo container on said blow mold so that the annular rim portion is supportingly engaged by an upper portion of the blow mold and the container-walling-forming portion of the embryo container is suspended downwardly from the annular rim portion into a mold cavity defined by said walls;
   inserting a blow pin into said opening, and snugly engaging said annular rim portion between said blow mold and said blow pin, thereby cooling said rim portion of said embryo container, with said container-walling-forming portion of said embryo container being spaced from said mold cavity walls of said blow mold;
   stretching and expanding said container-walling-forming portion of said embryo container into contact with said mold cavity walls of said blow mold by blow molding into the interior of said container-walling-forming portion, while maintaining said annular rim portion snugly engaged by and between said blow mold and said blow pin; and
   allowing said container to set and removing said container from said blow mold.

22. A method as claimed in claim 21, wherein the annular rim portion has an upwardly-opening annular channel formed therein in outwardly spaced but surrounding relationship to said opening, and wherein said blow pin snugly seats in said channel simultaneously with positioning of the mold pin within said opening.

23. A method as claimed in claim 21, wherein said rim portion has an upwardly-facing annular surface formed thereon externally adjacent and in surrounding relationship to said opening, and said blow pin having an outer annular portion which is disposed in snug contacting engagement with said annular surface simultaneous with projection of a center portion of said blow pin into said opening.

24. A method as claimed in claim 21, wherein said rim portion is relatively flat in an axial direction thereof in comparison to a radial extent thereof, said rim portion having an annular flange fixedly and integrally associated therewith in surrounding relationship to but spaced radially outwardly a substantial extent from said opening, said annular flange projecting axially downwardly away from said rim portion so as to be positioned in radially spaced but surrounding relationship to an upper portion of said container-walling-forming portion, and wherein the stretching and expanding of the container-walling-forming portion within the blow mold cavity causes an upper portion of the container-walling-forming portion, in the vicinity of the rim portion, to be expanded radially outwardly into engagement with said axially-extending annular flange, with the remainder of the stretched and expanded container-walling-forming portion being expanded so as to effectively constitute an extension of said annular flange.

25. A container made by the method of claim 21.

26. A method of making a container in which entry is via an opening inset from adjacent container walling of said container, said opening being in a rim of said container, said method comprising the steps of:

injection molding an embryo container in a heated condition from a material susceptible to deformation when heated, said embryo container comprising a bowl-like container-walling-forming portion integrally and monolithically joined at one end thereof to an outwardly protruding annular rim portion, said rim portion defining an opening therethrough which opens into the interior of said container-walling-forming portion, said embryo container being molded in an injection mold including an inner mold core which is extractable through said opening, and said injection mold defining exterior surfaces of said annular rim portion of said embryo container in substantially the final form thereof;

removing the embryo container in its entirety from the injection mold and transferring the embryo container at an elevated temperature to a further mold which has mold cavity walls defining the required final external shape of said container walling to be formed by said container-walling-forming portion;

positioning said embryo container on said further mold so that the annular rim portion is supportingly engaged by an upper portion of the further mold and the container-walling-forming portion of the embryo container is suspended downwardly from the annular rim portion into a mold cavity defined by said walls;

inserting a mold pin into said opening, and snugly engaging said annular rim portion between said further mold and said mold pin, thereby cooling said rim portion of said embryo container, with said container-walling-forming portion of said embryo container being spaced from said mold cavity walls of said further mold;

stretching and expanding said container-walling-forming portion of said embryo container into contact with said mold cavity walls of said further mold by pressure differential between the interior and exterior of said container-walling-forming portion, while maintaining said annular rim portion snugly engaged by and between said further mold and said mold pin; and allowing said container to set and removing said container from said further mold.

27. A method as claimed in claim 26, wherein said rim portion defines thereon an upwardly facing annular surface which is spaced radially outwardly from and surrounds said opening and is separated therefrom by an upwardly projecting annular rib associated with said rim portion, and said mold pin having a center portion which projects downwardly into said opening and a surrounding annular portion which is pressed into snug engagement with said annular surface to hold said rim portion in snug supportive engagement with said further mold.

28. A method as claimed in claim 26, wherein said rim portion is relatively flat in an axial direction thereof in comparison to a radial extent thereof, said rim portion having an annular flange fixedly and integrally associated therewith in surrounding relationship to but spaced radially outwardly a substantial extent from said opening, said annular flange projecting axially downwardly away from said rim portion so as to be positioned in radially spaced but surrounding relationship to an upper portion of said container-walling-forming portion, and wherein the stretching and expanding of the container-walling-forming portion within the mold cavity causes an upper portion of the container-walling-forming portion, in the vicinity of the rim portion, to be expanded radially outwardly into engagement with said axially-extending annular flange, with the remainder of the stretched and expanded container-walling-forming portion being expanded so as to effectively constitute an extension of said annular flange.

29. A method as claimed in claim 28, further comprising the step of providing a press-in lid which is a press fit in said opening of said container, whereby said opening forms a seat for said press-in lid and said lid can be levered off using said rim portion as a fulcrum.

30. A method as claimed in claim 26, further comprising the step of providing a press-in lid which is a press fit in said opening of said container, whereby said opening forms a seat for said press-in lid and said lid can be levered off using said rim portion as a fulcrum.

31. A container made by the method of claim 26.

32. A container structure that resembles a tin, comprising:

a top rim having an upwardly-open annular channel formed intermediate an upstanding inner rib and an upstanding outer wall, said upstanding outer wall having a downwardly-extending outer flange having a lower edge, and said upstanding inner rib surrounding an opening extending through said rim for accessing an interior of a container body;

said container body forming a one-piece construction with said rim and including container walling forming a side wall thereof, said opening in said rim being inset from said container walling, and said container walling depending from said opening, expanding outwardly against said lower edge of said flange and being homogeneous with said lower edge of said flange, and then stepping out below said lower edge of said flange to form an outer wall of said container body;

said top rim and said container body defining a container which is a monolithic one-piece construction of a plastics material formed principally by molding; and a lid which has a press fit engagement with the upstanding inner rib for closing off said opening of said container.

* * * * *